(12) United States Patent
Stagnitti et al.

(10) Patent No.: US 12,255,513 B2
(45) Date of Patent: Mar. 18, 2025

(54) AIR COOLED GENERATOR COLLECTOR TERMINAL DUST MIGRATION BUSHING

(71) Applicant: General Electric Company, Schenectady, NY (US)

(72) Inventors: Rachel Christine Stagnitti, Schenectady, NY (US); Andrew Brown, Schenectady, NY (US); Benjamin A. Mancuso, Schenectady, NY (US); Daniel Papa, Schenectady, NY (US); Alexander G. Beckford, Schenectady, NY (US); Gary E. Gottung, Schenectady, NY (US); Kevin C. Sheridan, Schenectady, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 351 days.

(21) Appl. No.: 17/823,094

(22) Filed: Aug. 30, 2022

(65) Prior Publication Data

US 2024/0072598 A1 Feb. 29, 2024

(51) Int. Cl.
*H02K 5/10* (2006.01)

(52) U.S. Cl.
CPC ..................... *H02K 5/10* (2013.01)

(58) Field of Classification Search
CPC ......... F24F 2005/0025; F24F 2006/008; F24F 3/00; F24F 3/14; F24F 6/00; F24F 6/18; F24F 8/133; H02K 13/02; H02K 5/10; H03K 19/17704; H03K 19/17736; H03K 19/1778; B01D 2252/103; B01D 2258/0283; B01D 2259/4508; B01D 47/02; B01D 47/021; B01D 51/10; B01D 53/18

See application file for complete search history.

(56) References Cited

U.S. PATENT DOCUMENTS

| | | | |
|---|---|---|---|
| 3,422,392 | A | 1/1969 | Woods |
| 4,584,429 | A | 4/1986 | Raketti et al. |
| 4,660,914 | A | 4/1987 | Nakamura |
| 5,382,856 | A * | 1/1995 | Keck .................. H02K 13/02 73/40 |
| 6,097,128 | A | 8/2000 | Ko |
| 6,465,926 | B2 | 10/2002 | Rehder et al. |
| 6,469,414 | B2 | 10/2002 | Rehder et al. |
| 6,632,109 | B2 * | 10/2003 | Irwin .................. H01R 4/70 439/825 |
| 2001/0054853 | A1 * | 12/2001 | Hayashi .............. H02K 5/225 310/71 |

(Continued)

FOREIGN PATENT DOCUMENTS

EP 0601826 A1 6/1994

*Primary Examiner* — Naishadh N Desai
(74) *Attorney, Agent, or Firm* — Eversheds Sutherland (US) LLP

(57) ABSTRACT

The present application provides a collector terminal dust mitigation assembly for use with collector terminals of generators to prevent dust entry into a collector terminal bore in a collector ring, wherein the collector terminals may have varying positions with respect to the collector rings. The collector terminal dust mitigation assembly may include one of a number of inner elements configured for a specific position of a collector terminal with respect to a collector ring and a standard outer element sized to accommodate the inner element.

14 Claims, 5 Drawing Sheets

(56) References Cited

U.S. PATENT DOCUMENTS

| | | | |
|---|---|---|---|
| 2003/0151328 A1* | 8/2003 | Cutsforth | H01R 39/40 |
| | | | 310/239 |
| 2012/0286614 A1 | 11/2012 | Draina et al. | |
| 2017/0292996 A1 | 10/2017 | Desabhatla et al. | |
| 2018/0301962 A1 | 10/2018 | Scalzo, III et al. | |
| 2020/0350795 A1 | 11/2020 | Mancuso et al. | |

* cited by examiner

AIR COOLED GENERATOR COLLECTOR TERMINAL DUST MIGRATION BUSHING

TECHNICAL FIELD

The present application and the resultant patent relate generally to electrical generators and more particularly relate to electrical generators used in combined cycle systems and the like with a collector terminal dust mitigation bushing assembly to prevent dust entry into the collector terminal bore and elsewhere.

BACKGROUND OF THE INVENTION

Conventional dynamoelectric machines include a rotor having windings that conduct electrical current during operation of the machine. As the rotor rotates, the rotating elements are used to conduct current to the rotor windings from a source external to the rotor. The rotating elements such as collector rings or commutators make contact with brushes and the like to conduct the current. As the brushes are stationary with respect to the rotating elements, the brushes, which are generally made of carbon, wear due to friction and may need periodic replacement.

Using carbon brushes to carry current to a field rotor inherently generates carbon dust as the brushes wear. The dust then may be dispersed about neighboring components. Contamination is an issue in this area because the buildup of dust may create electrical connectivity between the current-carrying collector terminal and the grounded rotor. This buildup of dust may lead to unplanned outages due to field grounds resulting in several days of lost generation for detection and cleaning. Additionally, air-cooled units may be subject to contamination collection from the cooling air. Buildup of such contamination may impact the current-carrying path. Generator components are designed with a minimum strike or creepage distance between grounded components (the rotor) and current-carrying components. These distances must be maintained for the field to function as intended.

Historically, the solution to these problems was either to (1) clean out the area and leave as is, (2) replace the collector ring entirely, an expensive and long-cycle part that customers would prefer not to replace and would add significant cost, or (3) install a single piece tube bushing that was recently developed but was only applicable in one of the two possible configurations and often did not fit, requiring challenging machining to custom-size.

SUMMARY OF THE INVENTION

The present application and the resultant patent provide a collector terminal dust mitigation assembly for use with collector terminals of generators to prevent dust entry into a collector terminal bore in a collector ring, wherein the collector terminals may have varying positions with respect to the collector rings. The collector terminal dust mitigation assembly may include one of a number of inner elements configured for a specific position of a collector terminal with respect to a collector ring and a standard outer element sized to accommodate the inner element.

The present invention and the resultant patent further provide a method of preventing entry of dust into a collector terminal positioned about a collector ring of a generator. The method may include the steps of selecting an inner bushing configured to accommodate a relative position of the collector terminal with respect to the collector ring, attaching the selected inner bushing to a standard outer bushing, applying a taper to the outer bushing, and installing the combined inner bushing and outer bushing onto the collector terminal.

The present application and the resultant patent further provide a collector terminal dust mitigation bushing assembly for use with collector terminals of generators to prevent the entry of dust into a collector terminal bore in a collector ring, wherein the collector terminals may have varying positions with respect to the collector rings. The collector terminal dust mitigation bushing assembly may include a number of inner bushings with one of the inner bushings including an aperture configured for a specific position of a collector terminal with respect to a collector ring and a standard outer bushing sized to accommodate the inner bushing and to be sealed thereto.

DETAILED DESCRIPTION

Figure 1:
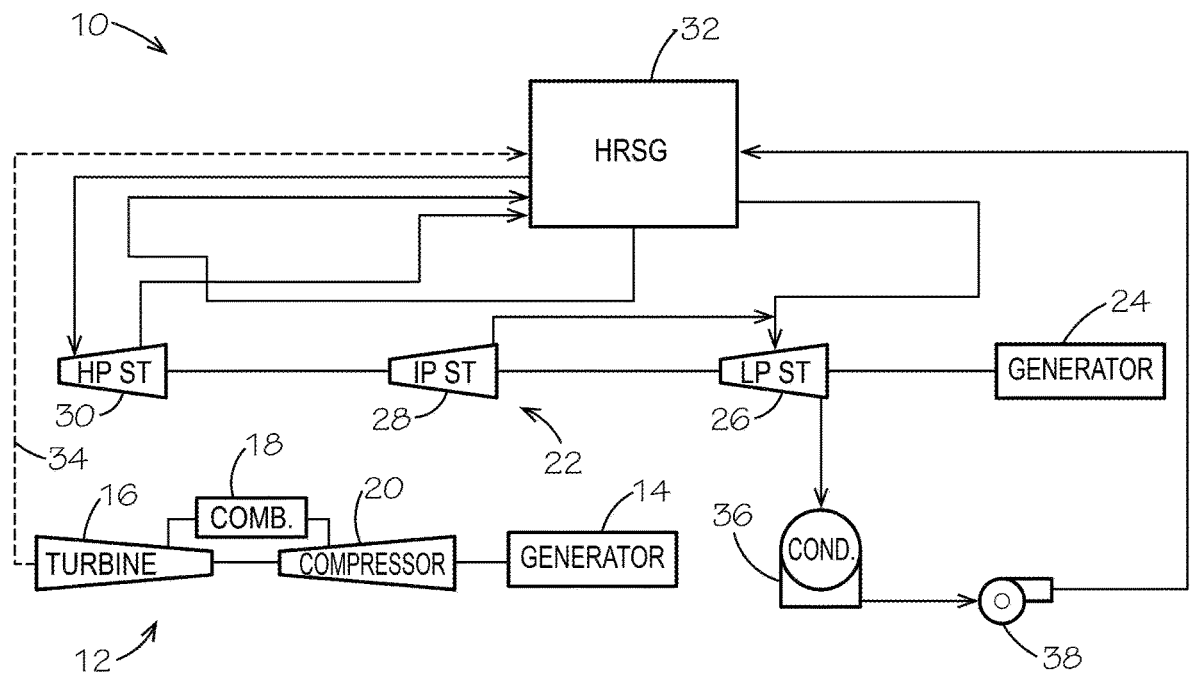
FIG. 1 is a schematic diagram of an exemplary gas turbine combined cycle system as may be described herein.

Referring now to the drawings, in which like numerals refer to like elements throughout the several views, FIG. 1 is a schematic diagram of an exemplary embodiment of a combined cycle power generation system 10. The combined cycle power generation system 10 may include a gas turbine, a steam turbine, and a heat recovery steam generator (HRSG). Specifically, the combined cycle system 10 may include a gas turbine 12 for driving a first generator 14 to produce electrical power. The gas turbine 12 may include a turbine 16, a combustor 18, and a compressor 20. The combined cycle system 10 also may include a steam turbine 22 for driving a second generator 24. The steam turbine 22 may include a low-pressure section 26 (LP ST), an intermediate-pressure section 28 (IP ST), and a high-pressure section 30 (HP ST). Although the gas turbine 12 and the steam turbine 22 may drive separate generators 14 and 24 as is shown herein, the gas turbine 12 and the steam turbine 22 also may be utilized in tandem to drive a single load via a single shaft. The generators and components described herein and the like may be incorporated into other types of power generation systems.

The combined cycle system 10 also may include a multi-stage heat recovery steam generator 32. Heated exhaust gas 34 from the gas turbine 12 may be directed into the heat recovery steam generator 32 to heat the steam used to power the steam turbine 22. Exhaust from the low-pressure section 26 of the steam turbine 22 may be directed into a condenser 36. Condensate from the condenser 36 may, in turn, be directed into a low-pressure section of the heat recovery steam generator 32 with the aid of a condensate pump 38.

Figure 2:
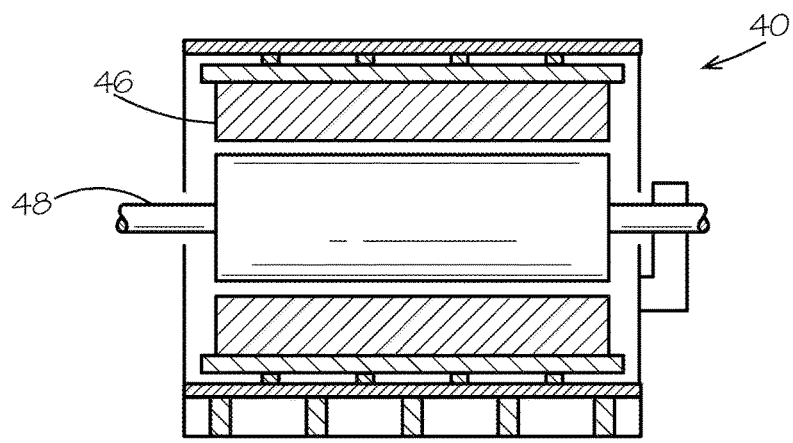
FIG. 2 is a sectional view of a generator for use in the gas turbine combined cycle system of FIG. 1.

FIG. 2 is a sectional view of an example of a generator 40 that may serve as the generator 14 and/or the generator 24 in the combined cycle power generation system 10 of FIG. 1 or in various other types of power generation systems. The generator 40 may include an annular frame 42, a stator 46, and a rotor 48. The rotor 48 may be driven to rotate by a gas turbine, a steam turbine, a wind turbine, a hydro turbine, an internal combustion engine, or any other suitable device configured to provide a rotational output. The rotor 48 may include a wire winding about a magnetic core. The rotor 48 may be disposed within the stator 46, which is configured to provide a stationary magnetic field. Rotation of the rotor 48 within the stator 46 generates electrical current within the wire winding, thereby producing an electrical output from the generator 40.

Figure 3:
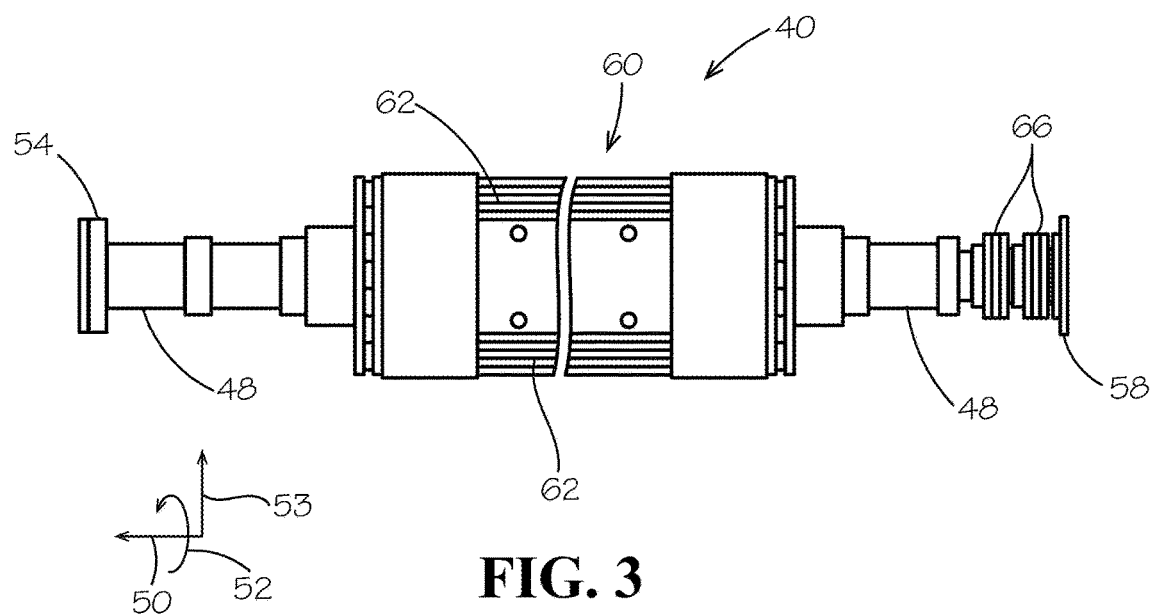
FIG. 3 is a plan view of a generator rotor of the generator of FIG. 2.

FIG. 3 is a plan view of an embodiment of the generator rotor 48 of the generator 40 of FIG. 2. As is shown, the rotor 48 may include a coupling 54, such as a mechanical mode or power turbine coupling, on one end. The rotor 48 extends in an axial direction 50 and rotates in a circumferential direction 52. Further, the rotor 48 extends within the stator 46 in a radial direction 53. On the other end of the rotor 48, there may be collector rings 56 thereon to provide an electrical junction for the rotor field windings. A collector fan 58 may be located adjacent to the collector rings 56. The rotor 48 may have a large diameter body 60 that holds coil windings 62. The coil windings 62 may be disposed in axially oriented 50 slots that extend radially 53 outward from the middle of the rotor 48 to the axial ends of the rotor body 60.

Figure 4:
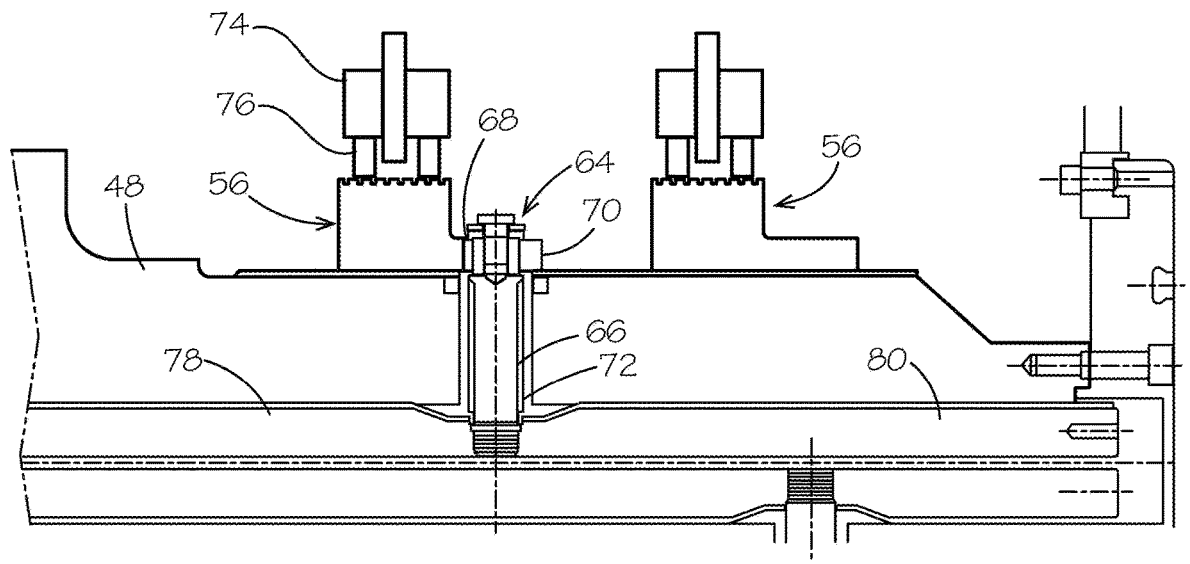
FIG. 4 is a side view of a portion of a rotor, collector rings, brush assemblies, and collector terminal of the generator rotor of FIG. 3.

FIG. 4 shows a side view of a pair of the collector rings 56 positioned on the rotor 48 and a collector terminal 64. The collector terminal 64 may be in the form of an elongated stud 66 that extends through a cut-out 68 in a collector ring flange 70 of the collector ring 56 and into a bore 72 in the rotor 48. The stud 66 may have a hex-shaped head 67 and the like thereon. As described above, the collector rings 56 may be positioned adjacent to a brush holder 74 with a number carbon brushes 76. Due to wear, carbon dust from the brushes 76 may accumulate about the cut-out 68 and the bore 72 of the collector terminal 64. The visible collector terminal 64 one the left connects a left collector ring to an axial bore copper 78 at the bottom of the view. A right collector ring has the same configuration, just about rotated 180° and is in communication with an opposite axial bore copper 80. Thus, current flows through the brush rigging into one collector ring, through the respective terminal and bore copper into the rest of the winding, into the opposite bore copper, through the other collector terminal, and out through the other collector ring and brush rigging.

Figure 5:
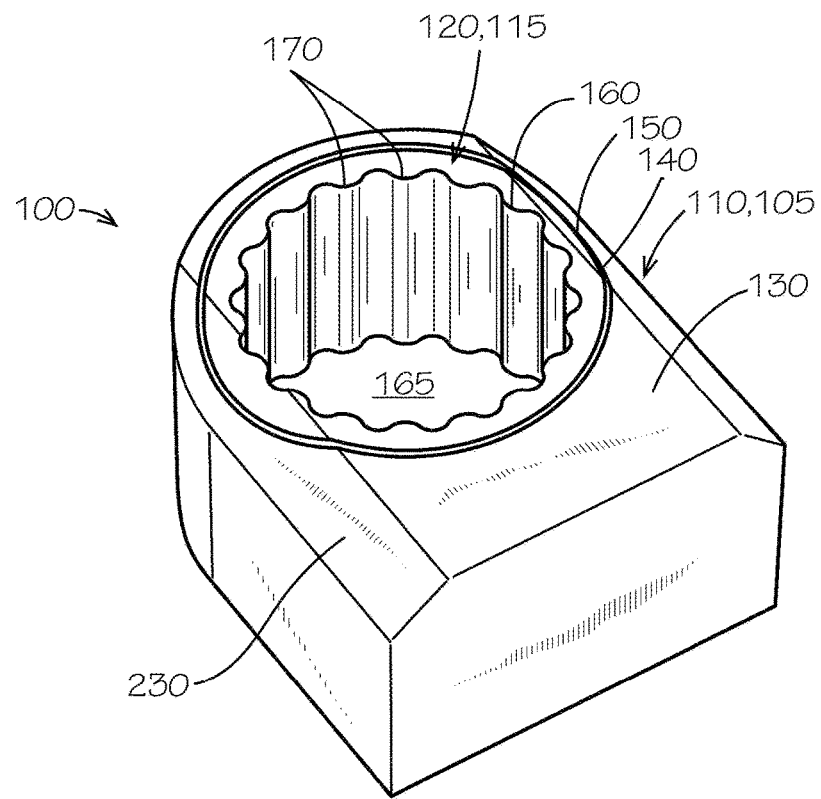
FIG. 5 is a perspective view of a collector terminal dust mitigation bushing assembly as may be described herein.

FIG. 5 shows a collector terminal dust mitigation bushing assembly 100 as may be described herein. The collector terminal dust mitigation bushing assembly 100 may be a two piece combination. The collector terminal dust mitigation bushing assembly 100 includes an outer element 105 such as an outer bushing 110 and an inner element 115 such as an inner bushing 120. The outer bushing 110 may have an outer substantially "D"-like shape 130 with an inner circular aperture 140. The outer bushing 110 may be sized to fit within the cut-out 68 in the collector ring flange 70 of collector rings 56 used with air cooled generator rotors 48 and the like having static excitation systems.

The inner bushing 120 may have a circular outer shape 150 and a pointed inner shape 160 defining an inner bushing aperture 165 therein. The circular outer shape 150 of the inner bushing 120 fits within the circular aperture 140 of the outer bushing 110. The pointed inner shape 160 of the inner bushing 120 accepts the collector terminal stud 66 of the collector terminal 64 at any orientation. In this example, the pointed inner shape 160 includes eighteen points 170 but any number of raised points 170 may be used. For example, six to eighteen or more raised points 170 may be used herein. The inner element 115 may be any type of interposing element or material that may accommodate the collector terminal stud 66. For example, different types of sealants, fillers, shims, and the like may be used.

Figure 6:
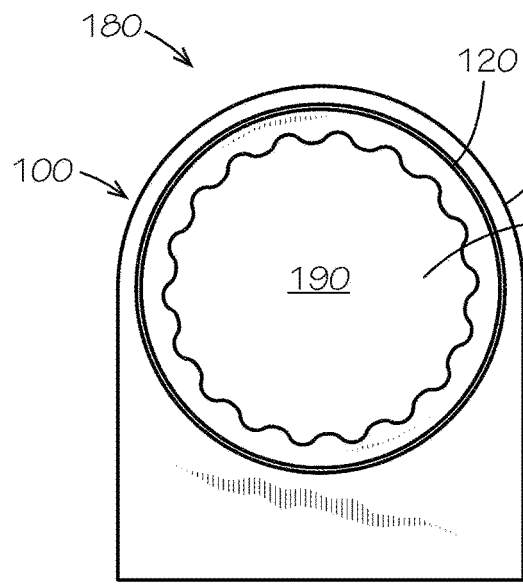
FIG. 6 is an embodiment of an inner bushing for use with the collector terminal dust mitigation bushing assembly of FIG. 5.
Figure 7:
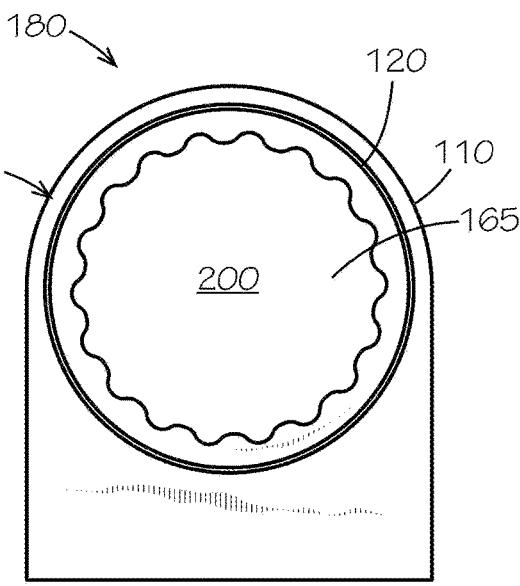
FIG. 7 is an alternative embodiment of an inner bushing for use with the collector terminal dust mitigation bushing assembly of FIG. 5.
Figure 8:
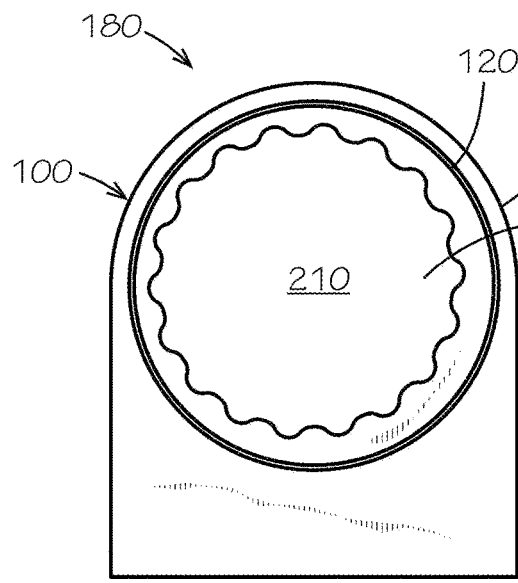
FIG. 8 is an alternative embodiment of an inner bushing for use with the collector terminal dust mitigation bushing assembly of FIG. 5.
Figure 9:
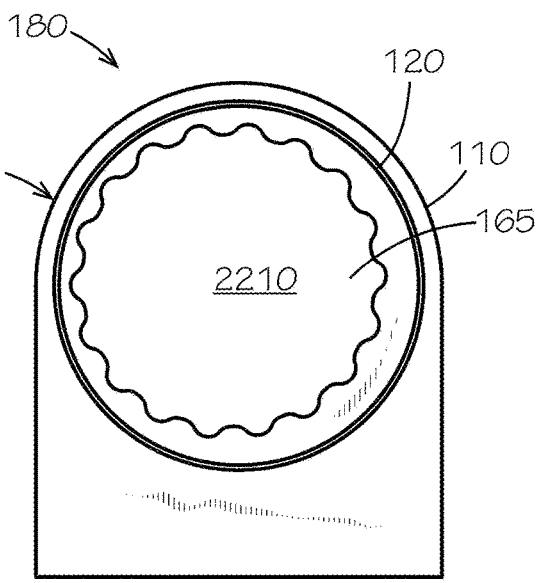
FIG. 9 is an alternative embodiment of an inner bushing for use with the collector terminal dust mitigation bushing assembly of FIG. 5.

FIGS. 6-9 show variations in the inner bushing 120. The relative positions of the rotor 48, the collector ring 56, and the collector terminal 64 may vary from unit to unit across the fleet. The collector terminal dust mitigation bushing 100 thus may have an inner bushing kit 180 with a number of differently configured inner bushings 120 that may be configured to accommodate the outer bushing 110. For example, FIG. 6 shows the inner bushing 120 with the aperture 165 of the pointed inner shape 160 having a dead center positon 190. FIG. 7 shows the inner bushing 120 with the aperture 165 of the pointed inner shape 160 having a first (axial) offset position 200. FIG. 8 shows the inner bushing 120 with the aperture 165 of the pointed inner shape 160 having a second (axial) offset position 210. FIG. 9 shows the inner bushing 120 with the aperture 165 of the pointed inner shape 160 having a third (axial) offset position 220. Each offset may move the aperture 165 of the pointed inner shape 160 about 20 mils or so off of the dead center position 190. Other distances and other directions may be used herein. In addition to axial offsets, different types of radial offsets also may be used. For example, one side of the inner bushing 120 may be thicker or deeper than the other side. Any number of variations and combinations may be used herein depending upon the nature of the fleet and the component therein. Other components and other configurations may be used herein.

Figure 10:
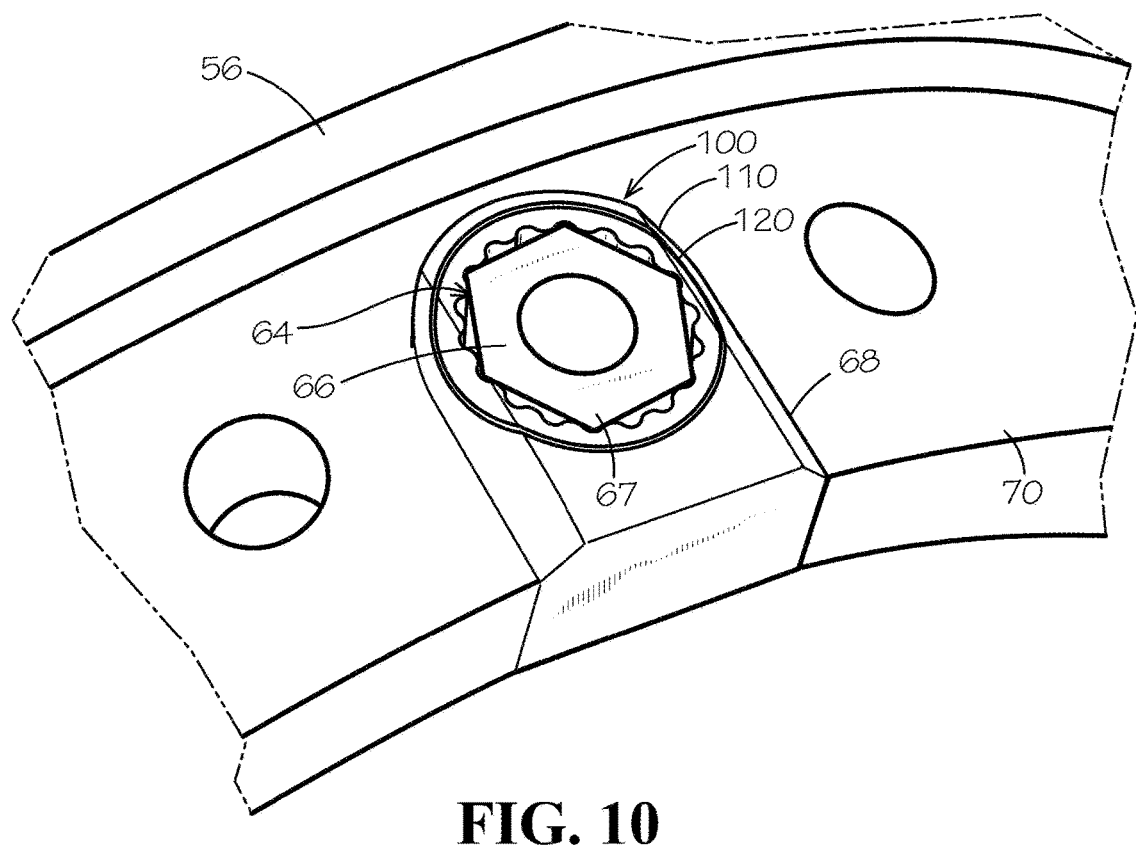
FIG. 10 is a perspective view of the collector terminal dust mitigation bushing assembly of FIG. 5 installed on the collector terminal.
Figure 11:
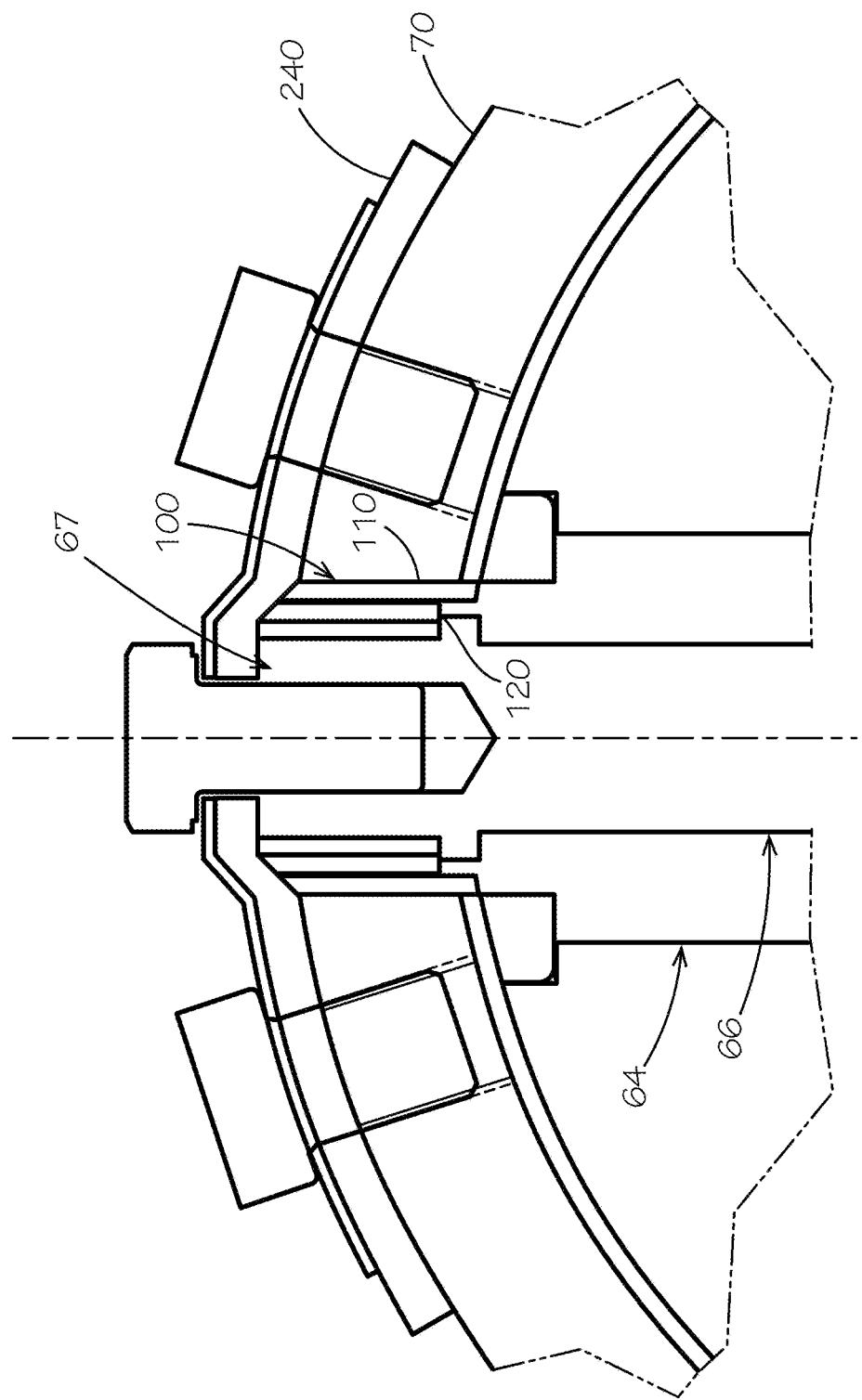
FIG. 11 is a side sectional view of the collector terminal dust mitigation bushing assembly of FIG. 5 installed on the collector terminal.

Once the correct inner bushing 120 has been selected, the inner bushing 120 may be bonded to the outer bushing 110 via conventional adhesives or other types of connection means. The collector terminal dust mitigation bushing assembly 100 then may be attached to the collector terminal 64. FIGS. 10 and 11 show the collector terminal dust mitigation bushing assembly 100 as installed about a collector terminal 64. A taper 230 may be machined into the outer bushing 110 for a smooth transition to the cut-out 68 of the collector ring 56 so as to accommodate a distribution strap 240 thereon. The taper 230 may be machined on site with minimal tooling for a custom fitting. Once in place, the combined collector terminal dust mitigation bushing assembly 100 eliminates surface discontinuity on the collector ring 56 so as to reduce cooling air turbulation.

In use, the correct inner bushing 120 may be selected to accommodate the position of the collector terminal 64 with respect to the collector ring 56 and the cut-out 68. The inner bushing 120 fits into the outer bushing 120 and around the collector terminal stud 66. The pointed inner shape of the inner bushing 120 will accept the collector terminal stud 66 at any orientation. Given that the inner bushings 120 are provided in the kit 180, the installer can choose which inner bushing 120 to use based on the specific parts and configurations at hand. Any required tooling is minimal such that the overall installation does not require the parts to be sent out for machining. Therefore, the fit can be performed in a shop or onsite in a timely manner and with minimal external support.

The inner bushing 120 may be sealed to the standard outer bushing 110. The combined collector terminal dust mitigation bushing assembly 100 then may be applied to the collector terminal 64. The combined collector terminal dust mitigation bushing assembly 100 thus may flexibly accommodate offsets and misalignments between the respective components. The combined collector terminal dust mitigation bushing assembly 100 does not require that the components will always be in the same position relative to each other. Rather, the two-piece design accommodates any relative positioning.

The combined collector terminal dust mitigation bushing assembly 100 thus provides full blockage of the collector terminal bore 72 to prevent the entry of dust or other contaminates. Functionally, the outer bushing 110 blocks dust entry axially and radially. The inner bushing 120 completes the radial dust blockage and secures the outer bushing 110 in place.

The combined collector terminal dust mitigation bushing assembly 100 may be provided as an add-on to field rewinds, as a standalone offering during normal onsite maintenance, or as a mitigation to a forced outage. The combined collector terminal dust mitigation bushing assembly 100 prevents the entry of all dust and other contaminates as opposed to minimizing accumulation for an extended generator lifetime with reduced maintenance.

It should be apparent that the foregoing relates only to certain embodiments of this application and resultant patent. Numerous changes and modifications may be made herein by one of ordinary skill in the art without departing from the general spirit and scope of the invention as defined by the following claims and the equivalents thereof.

Further aspects of the invention are provided by the subject matter of the following clauses:

1. A collector terminal dust mitigation assembly for use with collector terminals of generators to prevent dust entry into a collector terminal bore in a collector ring, wherein the collector terminals comprise varying positions with respect to the collector rings, the collector terminal dust mitigation assembly comprising: one of plurality of inner elements configured for a specific position of a collector terminal with respect to a collector ring; and a standard outer element sized to accommodate the inner element.
2. The collector terminal dust mitigation assembly of any preceding clause wherein the inner element comprises an inner bushing.
3. The collector terminal dust mitigation assembly of any preceding clause, wherein the inner bushing comprises a circular outer shape.
4. The collector terminal dust mitigation assembly of any preceding clause, wherein the inner bushing comprises a pointed inner shape defining an aperture therein.
5. The collector terminal dust mitigation assembly of any preceding clause, wherein the pointed inner shape comprises a plurality of raised points.
6. The collector terminal dust mitigation assembly of any preceding clause, wherein the aperture comprises a center position in the inner bushing.
7. The collector terminal dust mitigation assembly of any preceding clause, wherein the aperture comprises an offset position in the inner bushing.
8. The collector terminal dust mitigation assembly any preceding clause, further comprising a kit of a plurality of inner bushings.
9. The collector terminal dust mitigation assembly of any preceding clause, wherein the standard outer element comprises an outer bushing.
10. The collector terminal dust mitigation assembly of any preceding clause, wherein the outer bushing comprises a substantial "D" like shape.
11. The collector terminal dust mitigation assembly of any preceding clause, wherein the substantial "D"-like shape comprises a circular aperture.
12. The collector terminal dust mitigation assembly of any preceding clause, wherein the circular aperture is sized to accommodate the inner bushing therein.
13. The collector terminal dust mitigation assembly of any preceding clause, wherein the outer bushing comprises a taper thereon.
14. The collector terminal dust mitigation assembly of any preceding clause, wherein the collector terminal comprises a stud with a head and wherein the inner element accommodates the head therein.
15. A method of preventing entry of dust into a collector terminal positioned about a collector ring of a generator, comprising: selecting an inner bushing configured to accommodate a relative position of the collector terminal with respect to the collector ring; attaching the selected inner bushing to a standard outer bushing; applying a taper to the outer bushing; and installing the combined inner bushing and outer bushing onto the collector terminal.
16. A collector terminal dust mitigation bushing assembly for use with collector terminals of generators to prevent the entry of dust into a collector terminal bore in a collector ring, wherein the collector terminals comprise varying positions with respect to the collector rings, the collector terminal dust mitigation bushing assembly comprising: a plurality of inner bushings; wherein one of the plurality of inner bushings comprises an aperture configured for a specific position of a collector terminal with respect to a collector ring; and a standard outer bushing sized to accommodate the inner bushing and to be sealed thereto.
17. The collector terminal dust mitigation bushing assembly any preceding clause, wherein the inner bushing comprises a circular outer shape and an aperture therein.
18. The collector terminal dust mitigation bushing assembly of any preceding clause, wherein the aperture comprises a center position in the inner bushing.
19. The collector terminal dust mitigation bushing assembly of any preceding clause, wherein the aperture comprises an offset position in the inner bushing.
20. The collector terminal dust mitigation bushing assembly of any preceding clause, wherein the outer bushing comprises a substantial "D" like shape defining a circular aperture sized for the inner bushing.

We claim:

1. A collector terminal dust mitigation assembly for use with collector terminals of generators to prevent dust entry into a collector terminal bore in a collector ring, wherein the collector terminals comprise varying positions with respect to the collector ring, the collector terminal dust mitigation assembly comprising:
  one of a plurality of inner elements configured for a specific position of a collector terminal with respect to the collector ring; and
  a standard outer element sized to accommodate the inner element;
  wherein the inner element comprises an inner bushing; and
  wherein the inner bushing comprises a pointed inner shape defining an aperture therein.

2. The collector terminal dust mitigation assembly of claim 1, wherein the inner bushing comprises a circular outer shape.

3. The collector terminal dust mitigation assembly of claim 1, wherein the pointed inner shape comprises a plurality of raised points.

4. The collector terminal dust mitigation assembly of claim 1, wherein the aperture comprises a center position in the inner bushing.

5. The collector terminal dust mitigation assembly of claim 1, wherein the aperture comprises an offset position in the inner bushing.

6. The collector terminal dust mitigation assembly of claim 1, further comprising a kit of a plurality of inner bushings.

7. The collector terminal dust mitigation assembly of claim 1, wherein the standard outer element comprises an outer bushing.

8. The collector terminal dust mitigation assembly of claim 7, wherein the outer bushing comprises a substantial "D" like shape.

9. The collector terminal dust mitigation assembly of claim 8, wherein the substantial "D"-like shape comprises a circular aperture.

10. A collector terminal dust mitigation assembly for use with collector terminals of generators to prevent dust entry into a collector terminal bore in a collector ring, wherein the collector terminals comprise varying positions with respect to the collector ring, the collector terminal dust mitigation assembly comprising:
  one of a plurality of inner elements configured for a specific position of a collector terminal with respect to the collector ring; and
  a standard outer element sized to accommodate the inner element;
  wherein the standard outer element comprises an outer bushing;
  wherein the outer bushing comprises a substantial "D" like shape;
  wherein the substantial "D"-like shape comprises a circular aperture; and
  wherein the circular aperture is sized to accommodate the inner element therein.

11. The collector terminal dust mitigation assembly of claim 8, wherein the outer bushing comprises a taper thereon.

12. The collector terminal dust mitigation assembly of claim 1, wherein the collector terminal comprises a stud with a head and wherein the inner element accommodates the head therein.

13. A collector terminal dust mitigation bushing assembly for use with collector terminals of generators to prevent entry of dust into a collector terminal bore in a collector ring, wherein the collector terminals comprise varying positions with respect to the collector rings, the collector terminal dust mitigation bushing assembly comprising:
  a plurality of inner bushings;
  wherein at least one of the plurality of inner bushings comprises a circular outer shape and an aperture therein;
  wherein the aperture comprises an offset position configured for a specific position of a collector terminal with respect to a collector ring; and
  a standard outer bushing sized to accommodate the at least one of the plurality of inner bushings and to be sealed thereto.

14. The collector terminal dust mitigation bushing assembly of claim 13, wherein the outer bushing comprises a substantial "D" like shape.

* * * * *